United States Patent
Jeddeloh

(10) Patent No.: US 7,149,857 B2
(45) Date of Patent: Dec. 12, 2006

(54) OUT OF ORDER DRAM SEQUENCER

(75) Inventor: Joseph M. Jeddeloh, Shoreview, MN (US)

(73) Assignee: Micron Technology, Inc., Boise, ID (US)

(*) Notice: Subject to any disclaimer, the term of this patent is extended or adjusted under 35 U.S.C. 154(b) by 254 days.

(21) Appl. No.: 10/143,896

(22) Filed: May 14, 2002

(65) Prior Publication Data

US 2003/0217239 A1    Nov. 20, 2003

(51) Int. Cl.
G06F 12/00 (2006.01)
G06F 13/00 (2006.01)
G06F 12/06 (2006.01)

(52) U.S. Cl. .............. 711/158; 711/154; 711/157; 711/105; 711/167; 711/169; 711/104; 711/2

(58) Field of Classification Search ........... 711/154, 711/157–158, 167, 169; 710/58
See application file for complete search history.

(56) References Cited

U.S. PATENT DOCUMENTS

| | | | |
|---|---|---|---|
| 5,388,247 A | 2/1995 | Goodwin et al. ........... 395/425 |
| 5,461,718 A | 10/1995 | Tatosian et al. ........... 395/250 |
| 5,522,059 A | 5/1996 | Marushima et al. | |
| 5,537,572 A | 7/1996 | Michelsen et al. ......... 395/462 |
| 5,630,096 A | 5/1997 | Zuravleff et al. | |
| 5,630,099 A | 5/1997 | MacDonald et al. ... 395/999.999 |
| 5,638,374 A * | 6/1997 | Heath ..................... 370/322 |
| 5,664,153 A | 9/1997 | Farrell .................... 395/481 |
| 5,701,434 A | 12/1997 | Nakagawa ................ 395/484 |
| 5,819,076 A | 10/1998 | Jeddeloh et al. ........... 395/552 |
| 5,848,025 A | 12/1998 | Marietta et al. ......... 365/238.5 |
| 5,872,822 A | 2/1999 | Bennett .................. 365/238.5 |
| 5,907,863 A | 5/1999 | Bolyn ...................... 711/167 |
| 5,983,325 A | 11/1999 | Lewchuk .................. 711/137 |
| 6,052,134 A | 4/2000 | Foster ...................... 345/521 |
| 6,052,756 A | 4/2000 | Barnaby et al. ........... 711/105 |
| 6,061,759 A | 5/2000 | Guo ........................ 711/105 |
| 6,181,638 B1 | 1/2001 | Jeddeloh .................. 365/233 |
| 6,204,864 B1 | 3/2001 | Chee ....................... 345/521 |
| 6,212,231 B1 | 4/2001 | Takano .................... 375/240 |
| 6,212,598 B1 | 4/2001 | Jeddeloh .................. 711/105 |
| 6,212,611 B1 * | 4/2001 | Nizar et al. ............... 711/169 |
| 6,275,913 B1 | 8/2001 | Jeddeloh .................. 711/158 |
| 6,295,586 B1 | 9/2001 | Novak et al. ............. 711/154 |
| 6,295,592 B1 | 9/2001 | Jeddeloh .................. 711/169 |
| 6,330,647 B1 | 12/2001 | Jeddeloh et al. .......... 711/158 |
| 6,330,683 B1 | 12/2001 | Jeddeloh .................. 713/401 |
| 6,385,708 B1 | 5/2002 | Stracovsky et al. | |
| 6,510,474 B1 * | 1/2003 | Stracovsky et al. ......... 710/58 |

* cited by examiner

*Primary Examiner*—Mano Padmanabhan
*Assistant Examiner*—Mardochee Chery
(74) *Attorney, Agent, or Firm*—Dickstein Shapiro LLP

(57) ABSTRACT

Memory access requests are successively received in a memory request queue of a memory controller. Any conflicts or potential delays between temporally proximate requests that would occur if the memory access requests were to be executed in the received order are detected, and the received order of the memory access requests is rearranged to avoid or minimize the conflicts or delays and to optimize the flow of data to and from the memory data bus. The memory access requests are executed in the reordered sequence, while the originally received order of the requests is tracked. After execution, data read from the memory device by the execution of the read-type memory access requests are transferred to the respective requesters in the order in which the read requests were originally received.

54 Claims, 7 Drawing Sheets

OUT OF ORDER DRAM SEQUENCER

FIELD OF THE INVENTION

The present invention relates to the architecture and operational method of a memory controller for controlling memory access operations to achieve an increased effective memory bandwidth.

BACKGROUND OF THE INVENTION

In most computer or data processing systems, the main active memory, or random access memory (RAM), is a dynamic random access memory (DRAM). The structure of a DRAM is generally composed of a number of memory cells organized into a plurality of banks. Each bank corresponds to an array of the memory cells with each cell being respectively associated with a unique memory address. In particular, memory addresses within a bank are each designated by a row address and a column address, wherein each row address is defined as a memory page. Each page of memory, therefore, contains several memory locations corresponding to the different column designations within the page.

When performing a series of access requests, if a currently requested page is found in a same bank currently having another page open, such condition is known as a "page conflict," whereupon the previously opened page must first be closed, or "precharged." After precharging, the requested page may then be opened, or "activated," and then the read or write operation is performed. A "page miss" occurs if the currently requested page is found in a bank which has no page open, thus requiring an activation procedure to be performed. A "page hit" is said to occur when a current memory access request is for a page which is already open from a previous memory access request.

Due to the extra processing which must be performed for page conflict and page miss memory accesses relative to page hit requests, the time needed to perform the former two processes is significantly greater than for the latter. In early stages of microprocessor technology development, requests to access a DRAM memory page, for both read and write operations, were received and fulfilled on a first in, first out basis. Such processing tends to be very inefficient, resulting in a large number of page misses and conflicts, and thus requiring an extensive dedication of processor and/or memory controller resources to precharging and activating memory pages.

More recently, more advanced processing methods have been developed in which memory access is based on priority. The priority of the access request may be based on various factors such as the type of device sending the request, the type of access requested, the memory address desired to be accessed by the request, etc. The problem with providing memory access strictly on priority, however, is that low priority requests may be denied access for unacceptably long periods of time.

Moreover, as each new generation of computers evolves, memory clock speeds, are increased significantly. As the speed of a memory's clock increases, the potential occurrences of and the time penalty for page miss memory operations, bank busy conflicts, and other conflicts also become increasingly significant. In particular, the data bus used to transfer information to and from each accessed memory location is idle during precharging, activating, waiting for bank availability, etc.

A solution is therefore needed to mitigate the drawbacks discussed above. In particular, memory processing efficiency would be greatly improved if the order of a sequence of received memory access requests could be rearranged to avoid or reduce conflicts. By avoiding or reducing conflicts, the memory data bus is more efficiently utilized in that idle time in the memory data bus is reduced or eliminated, which thereby effectively increases the memory bandwith of the memory system and enables more memory access transactions to occur in a shorter amount of time than previously possible.

BRIEF SUMMARY OF THE INVENTION

The present invention seeks to address the problems identified in the prior art by rearranging the sequentially received order of DRAM access requests to minimize conflicts and delays such as those discussed above, while returning the requested information to requesting units in the same order in which the requests were originally received.

In the present invention, memory access requests are successively received in an input queue of a memory controller. A sequence matrix is arranged after the request input queue, whereupon conflicts or potential delays between sequential requests are identified by a conflict detector. The conflict detector re-orders the memory core access requests to optimize the flow of data to and from the data bus. For example, if a bank busy condition or other delay is recognized by the conflict detector in the sequentially received memory requests, the memory controller rearranges the order in which the pending memory requests will be executed to eliminate the conflict or delay, if possible, or otherwise to minimize the delay.

Write requests can also be executed out of order as long as there are no addressing conflicts with earlier requests.

The re-ordered sequence is retained in an execution queue, wherein each request is tagged to indicate its location in the original sequence so that returned data can be properly re-ordered in the memory controller to match the order of the incoming memory access requests.

A command selector selects a command or commands to be executed from the execution queue. The command selector contains interface timing characteristics which enables a constant speed DRAM sequencer to interface with multiple clock speeds without complicated clock phasing operations.

A read return queue tracks the returned data obtained from the DRAM. Based on the tag associated with each returned data, the read return queue returns the read data to the respective requestors in the original sequential order. Specifically, upon executing a read request, if the tag associated with the returned data corresponds with the read request having the longest latency in the memory controller, the returned data is returned to the system unit which requested the data. If the tag is not associated with the read request having the longest latency, the returned data is stored in a buffer until returned data for all read requests having a longer latency are returned to their respective requestors.

Alternatively, each request can be assigned a buffer location based on the received request sequence. When returned data obtained from the DRAM is placed into the buffer location corresponding to the read request received earliest in the input queue, that data is returned to the appropriate requester. Otherwise, the returned data is retained in the buffer until all prior read requests as received in the input queue have been executed. In this manner, the read return queue returns data from the buffer locations in the order in which they were originally received.

BRIEF DESCRIPTION OF THE DRAWINGS

Further features, aspects, and advantages of the present invention will become apparent from the following detailed description of a preferred embodiment of the invention, described with reference to the accompanying drawings, wherein.

DETAILED DESCRIPTION OF THE INVENTION

For ease of description, the preferred embodiments of the present invention are discussed below as being used in conjunction with dynamic random access memory (DRAM) devices. Nevertheless, it should be understood that the present invention is not limited to applications involving DRAM. Rather, it is emphasized that the memory controller and methods of the present invention may be used in conjunction with other types of random access memories, such as static RAMs (SRAM) and the many different sub-species of DRAMs, including, for example, fast page mode DRAM (FPM DRAM), extended data out DRAM (EDO DRAM), burst EDO DRAM, synchronous DRAM (SDRAM), double data rate DRAM (DDR DRAM), Rambus DRAM (RDRAM), etc.

Figure 1:
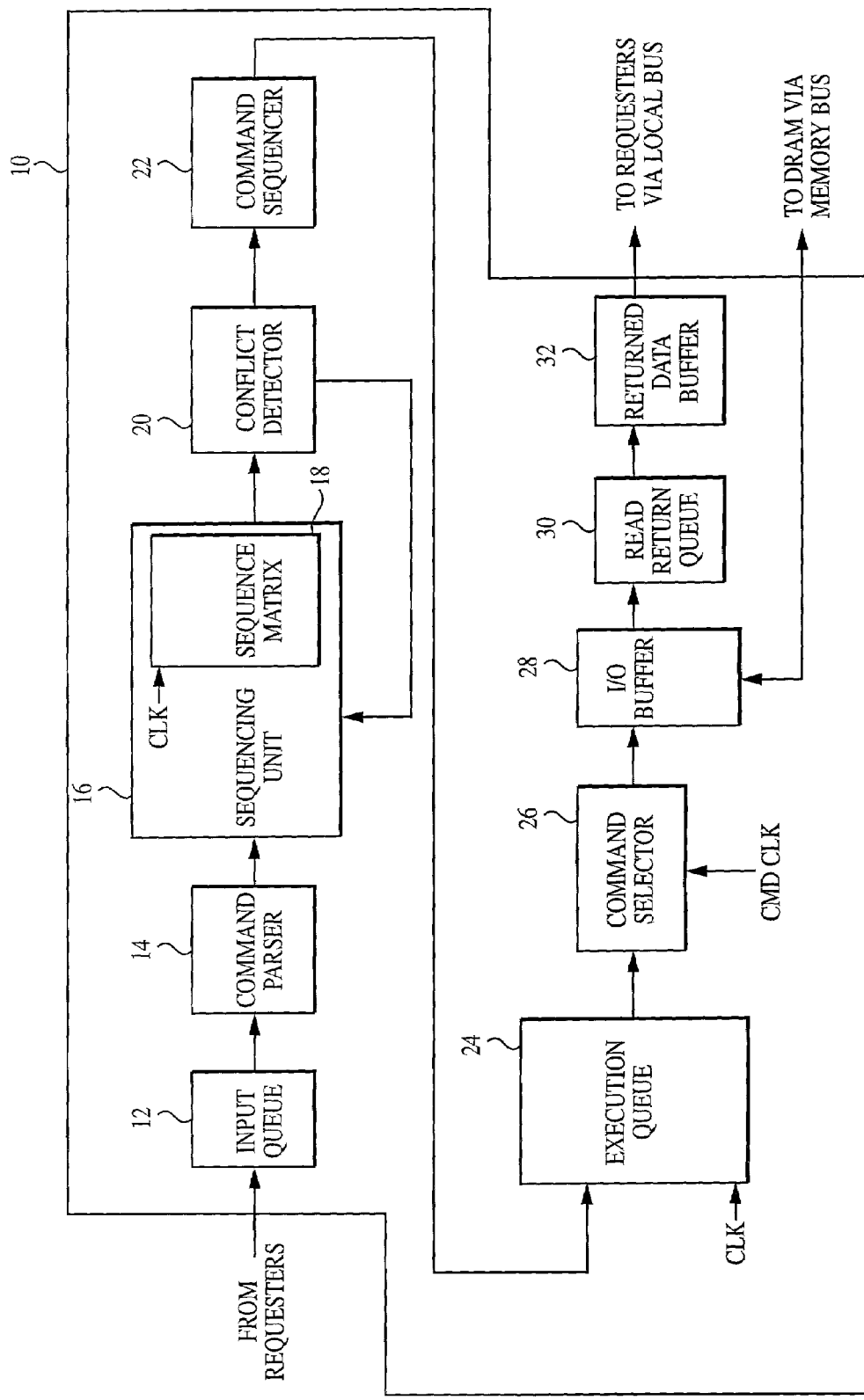
FIG. 1 is a block diagram of a memory controller in accordance with the present invention.

FIG. 1 shows a memory controller 10 in accordance with the present invention, and which includes an input queue 12, a command parser 14, a sequencing unit 16, a sequence matrix 18, a conflict detector 20, a command sequencer 22, an execution queue 24, a command selector 26, an input/output buffer 28, a read return queue 30, and a returned data buffer 32.

Memory access requests enter the memory controller 10 and are received in input queue 12 on a first-in first-out basis. The received requests are then sequentially processed by command parser 14 to obtain relevant information from each request signal, such as memory address (MA) data, a chip select (CS) command (indicating a requested memory bank to be accessed), a row address select (RAS) command, and a column address select (CAS) command, and a write enable (WE) state for indicating whether the request is a read or a write operation.

The information obtained is then provided to the sequencing unit 16, which places the received memory access requests into a sequence matrix 18 in accordance with a clock signal received in the sequence matrix 18. It is noted that upon startup of the process, the access requests are loaded into the matrix in the order in which they are received in the sequencing unit 16.

Conflict detector 20 monitors the information in the sequence matrix 18 and checks for any conflicts or delays that may occur if the sequence of requests in the matrix were to be executed in the current order in the sequence matrix. Any conflict or delay detected by conflict detector 20 is reported back to sequencing unit 16, which then rearranges the order of the requests in the matrix to minimize or eliminate the time the memory data bus is idle due to the identified conflicts or delays. Conflicts which may be detected by conflict detector 20 include, but are not limited to, page conflicts and bank busy conditions in which a memory bank is busy performing another read or write operation, for example. Delays identified by the conflict detector are conditions which, while not necessarily a conflict with the execution of another memory access request, would require the performance of preparatory steps during which time the memory data bus is idle. Such delays include, for example, page conflicts, page misses, etc.

Generally, both read and write type memory access requests may be re-ordered in the sequence matrix 18. However, it is preferable that write requests only be rearranged if necessary to the extent that the re-ordered sequence does not create any addressing conflicts with earlier received requests in to the input queue or otherwise interfere with the data stored or to be stored in the relevant memory locations in connection with any other memory access requests in the matrix.

As additional memory access requests are moved into the sequence matrix 18, while also being rearranged to resolve conflicts or reduce delays by sequencing unit 16, the requests at the front of the sequence are moved into the execution queue 24, which serves as a transfer buffer where the rearranged requests await execution. Depending on the conflict resolution process used in the sequencing unit 16, the requests may be moved into the execution queue 24 either on a continuous basis in accordance with a clock signal, in batches of a predetermined number of access requests, or based on a predetermined cumulative size of the requests. Preferably, the clock (CLK) for the execution queue 24 is the same clock (CLK) guiding the loading of sequence matrix 18.

Command sequencer 22 arranges the various commands associated with each request transferred to execution queue 24 from the sequence matrix 18, as it may be necessary to insert and/or temporally separate data control commands from the read or write command of a particular memory access request. For example, if a read or write request sent to execution queue 24 requires a precharging and/or activation operation, a data control command to initiate the precharging and/or activation operation is placed in the execution queue ahead of the relevant read or write operation, with at least one other read or write command associated with a different access request positioned between the precharge and/or activate command and the associated read or write command.

An advantage of the present invention is realized by separating the read or write commands from such data control commands in this manner. Specifically, in the above example, the precharge and/or activation operation in the above example can be performed while the read or write command for another memory access request can be immediately executed. Thus, the memory data bus does not have to be idle during the time the pre-charge and/or activation operation is perfomed.

When each read request is transferred to the execution queue, a tag is temporarily added to the data control commands for that request, for identifying the original relative placement of the each request as received in the input queue 12. Alternatively, each read request may be assigned a respective buffer location in a read buffer 32, which will be described in more detail later.

In accordance with a command select clock (CMD CLK) signal fed into command selector 26, one or more memory access requests from the front of the execution queue 24 is (are) selected for execution in the appropriate DRAM bank(s). For example, if the command select clock signal is four times the speed of the clock speed at which requests are loaded into sequence matrix 18, then four access requests are removed from execution queue 24 for each clock signal of queue 24. In this case, command selector 26 regulates the request selection process so that the four access requests which are all selected at one time from queue 24 are executed at even intervals. If the commands are selected from the execution queue for execution at the same clock speed at which new requests are entered into the sequence matrix 18, then command selector 26 may be omitted from memory controller 10.

I/O buffer 28 is a transition buffer used during the read or write operation specified in each access request. If a current access request to be executed is a write operation, the data to be written into the selected memory cell is temporarily written into I/O buffer 28. Similarly, data read from a selected memory cell in a read operation is temporarily stored in I/O buffer 28.

Upon execution of the requested memory access, each read request is placed into a read return queue 30. Read return queue 30 manages the requested data read from the DRAM upon execution of the read requests, and returns the requested data to the respective requestors in the order in which they were received in the input queue. Data read from the DRAM is either transferred directly to the requestor or is placed into returned data buffer 32, depending on the tag or assigned buffer location associated with the returned request data.

Figure 2:
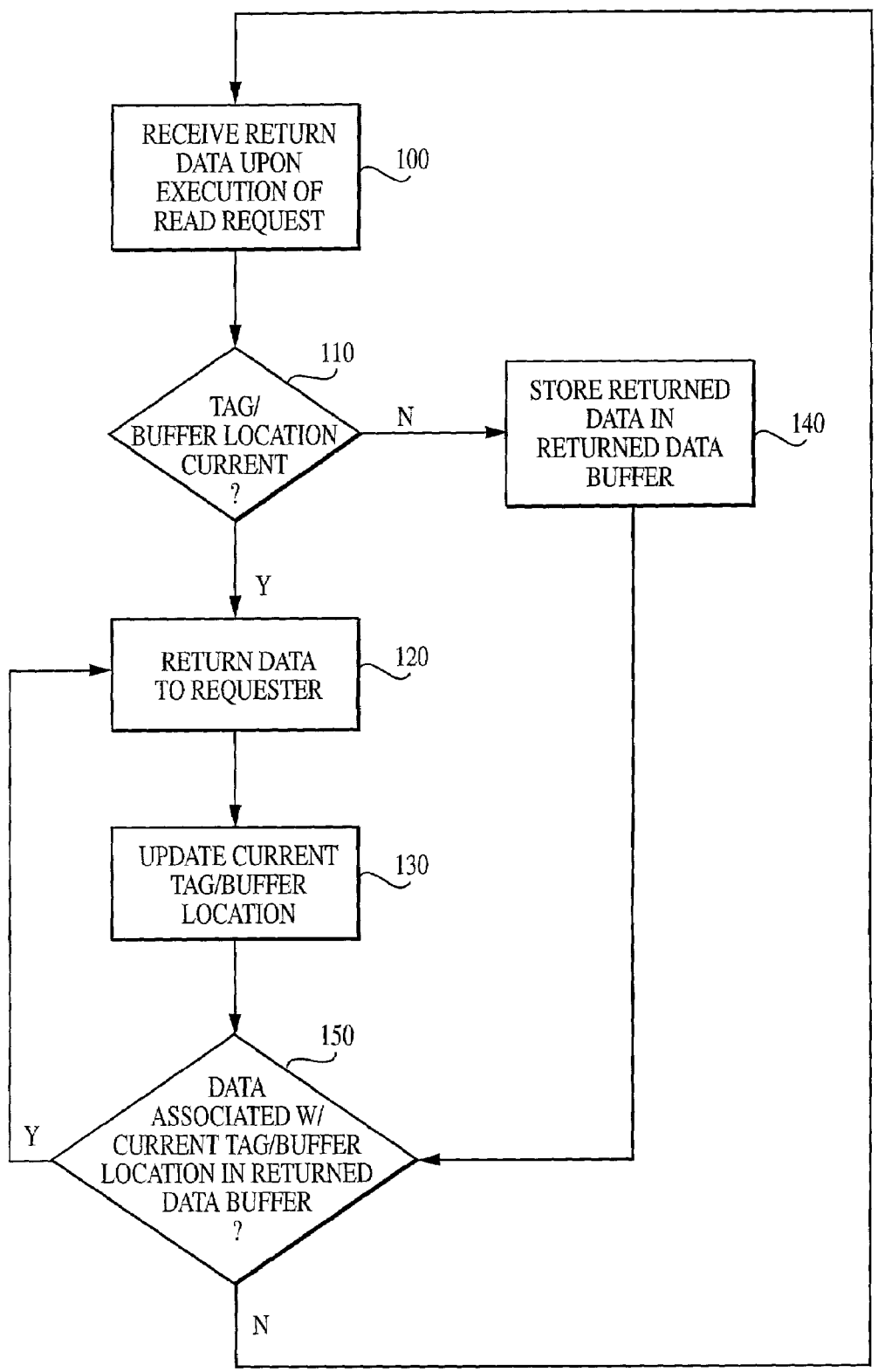
FIG. 2 is a flowchart illustrating the process for returning requested data obtained by the re-ordered execution of read requests to their respective requestors in the originally received order of the requests.

Referring now to FIG. 2, after executing a read request, the executed read request is returned to the read request queue 30, with the data obtained by the request being temporarily held in I/O buffer 28 (step 100). If the read request queue 30 determines at step 110 that the returning read request is associated with the most current tag or assigned buffer location, the data obtained by that request is returned to the requestor at step 120, and the current tag/buffer location information is updated at step 130.

A tag or buffer location is "current" if it is assigned to or associated with the read request having the longest latency in the memory controller 10. Read return queue 30 may keep track of the most current tag or buffer location, for example, by incrementing a count value which represents the current tag or buffer location each time a returned data is transferred to its requestor.

If the returning read request has a tag or an assigned buffer location which is not current, the data is placed into the read data buffer 32 (step 140) until the associated tag or buffer location becomes current. After placing the returned data into the buffer 32 in step 140 or after updating the current tag or buffer location in step 130, the read return queue 30 determines whether or not returned data corresponding to the current tag or buffer location can be found in the returned data buffer 32. If "yes," the process returns to step 120, where the current returned data is transferred to the requestor of that data, and the current tag or buffer location is again updated in step 130. If returned data corresponding to the current tag or buffer location is not found in the buffer 32, the process returns to step 100 to receive the returned data obtained by the execution of the next read request in the execution queue. Due to this process shown in FIG. 2, the read data is returned to the respective requestors in the order in which the requests were received into the input queue 12.

If tags are used to indicate the originally received order of the read requests, the tags are temporarily inserted among the data control commands of each request, but are not included in the read data returned to the requestors. Preferably, the functions of the read return queue 30 and of the returned data buffer 32 are performed according to a clock speed corresponding to the clock speed of the DRAM or an integral multiple thereof. As such, returned read requests and returned data received in the read return queue 30 and returned data buffer 32 can be coordinated with the updating of the current tag/buffer location and the transferring of the returned data, respectively.

Figure 3:
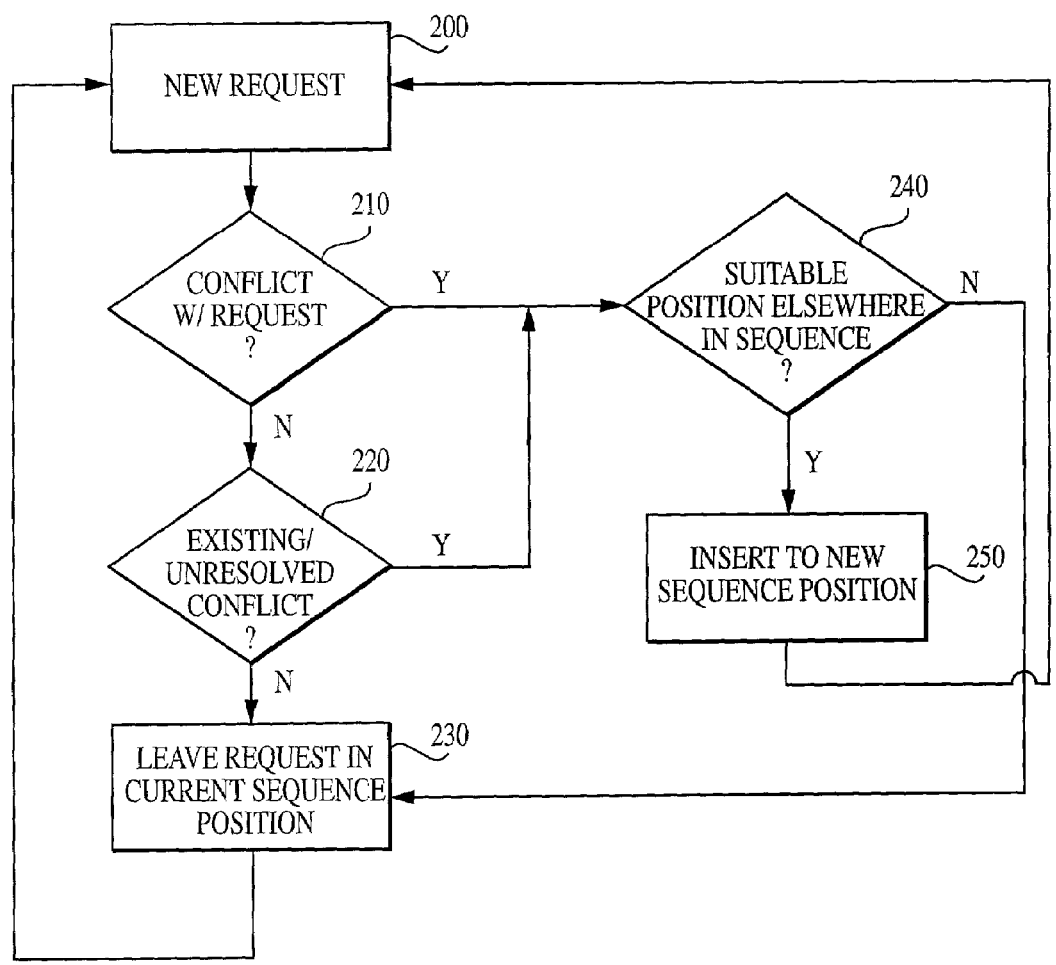
FIG. 3 is a first embodiment of a conflict re-ordering process performed by the sequence load logic unit in the memory controller upon detection of a conflict or delay in a current timing matrix.

A first embodiment of a conflict re-ordering process which the sequencing unit 16 may use to reschedule a memory access request due to a detected conflict or delay will be described with reference to the flowchart shown in FIG. 3 At step 200, the last memory access request to be parsed is placed in the sequence matrix 18. At step 210, the status of the memory bank desired to be accessed is checked to determine if any conflicts or delays would occur if the newly arrived memory access request is executed at its present position in the sequence matrix 18.

If sequencing unit 16 detects a conflict or delay with respect to the newly arrived request, sequencing unit 16 determines at step 240 whether a more suitable timing position can be found among the sequence of memory access requests ahead of its current position. Specifically, sequencing unit 16 first determines whether any unresolved conflicts or delays are present in the sequence ahead of the new access request, and if so, whether or not the new access request can be performed during that time without conflict. If there are no pending conflicts or delays, sequencing unit 16 checks whether the new access request may be rescheduled at any point in the matrix without causing any new conflicts or delays among the previously scheduled requests. If not, the process is redirected to step 230, whereupon the new access request is left at the end of the current timing sequence with the unresolved condition. If a suitable timing position can be found ahead in the sequence, the newly arrived request is inserted into sequence at that position (step 250). The process is then returned to step 200 to be repeated for the next incoming memory access request.

If, on the other hand, no conflict or delay is detected with respect to the newly arrived access request, the conflict detector 20 next determines at step 220 whether any unresolved conflicts or delays are present in the timing matrix ahead of the current position of the newly arrived request. If an unresolved conflict or delay is found, the process is redirected to step 240 discussed above. If no existing conflicts are found, the sequencing unit 16 leaves the request in its current position in sequence matrix 18 at step 230, and then returns to step 200 to repeat the process for the next incoming memory access request.

In this embodiment, any unresolved conflicts or delays may or may not be later resolved with the arrival of a new access request with a subsequent iteration of the sequencing unit 16. If no suitable request arrives to alleviate the conflict or delay, the memory access requests will continue to be processed in the designated order, but there will be some inefficiency in utilization of the memory data bus line due to the unresolved conflict(s) or unmitigated delay(s).

Figure 4:
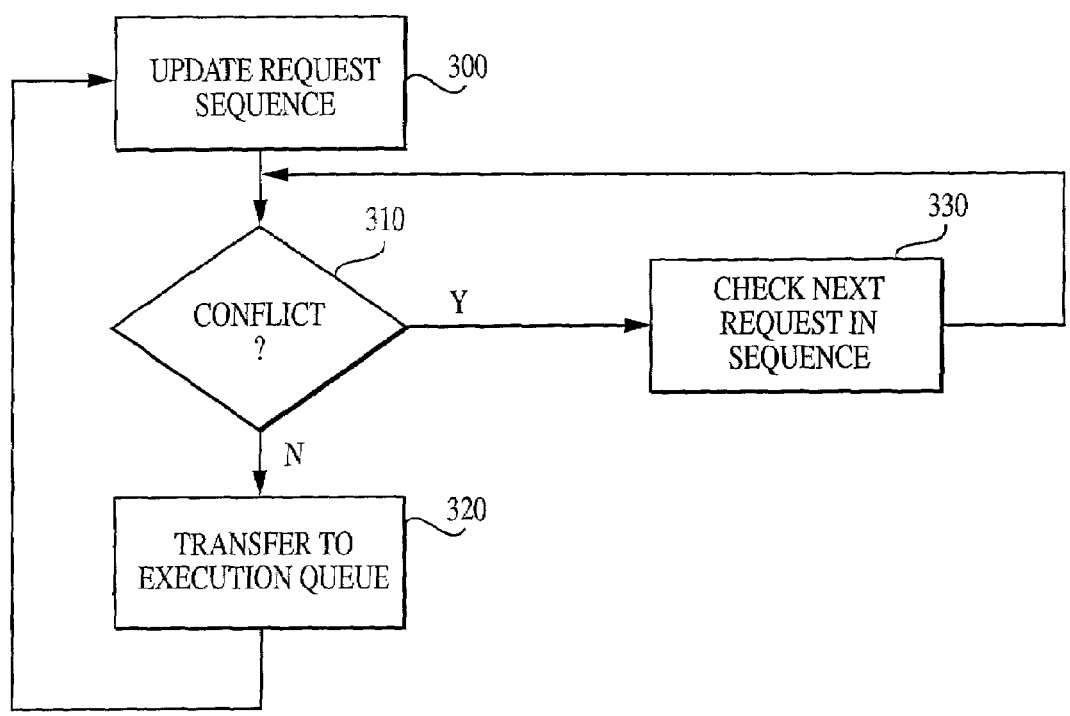
FIG. 4 is a second embodiment of a conflict re-ordering process performed by the sequence load logic unit in the memory controller upon detection of a conflict or delay in a current timing matrix.

A second embodiment of the conflict re-ordering process performed by sequencing unit 16 is illustrated in the flowchart shown in FIG. 4. As another memory access request is moved out of the sequence matrix 18 to the execution queue 24, the access request next in line in the sequence matrix is moved into the first location of the sequence matrix at step 300. At step 310, conflict detector 20 determines whether a conflict or delay is present with respect to the access request at the head of the sequence matrix (i.e., the earliest one in among the requests in the matrix). If no conflict is found, the access request is passed onto the execution queue 24 at step 320, and the process returns to step 300.

On the other hand, if a conflict or delay is detected in step 310, the conflict detector 20 turns its attention to the next access request in the sequence matrix, and determines at step 330 whether or not that request can be performed at that time position without any conflicts. If no conflicts or delays would be created by scheduling that access request at that time position, the request is sent to the execution queue 24 at step 320, and the process returns to step 300. If a conflict or delay is found, the process repeats step 330 until a request is found which may be suitably executed at that time position.

In this embodiment, if a conflict or delay is found to exist with respect to the memory access of the request at the head of the sequence matrix, and any subsequent requests, the rejected requests remain in their current position in the sequence until a suitable time slot is found for the request. With this process, no memory access will be sent to the execution queue 24 with a conflict or delay condition. Also, each request is given priority based on latency, and will be executed at the earliest possible time slot in which no conflict condition is created by the timing of that request.

Figure 5:
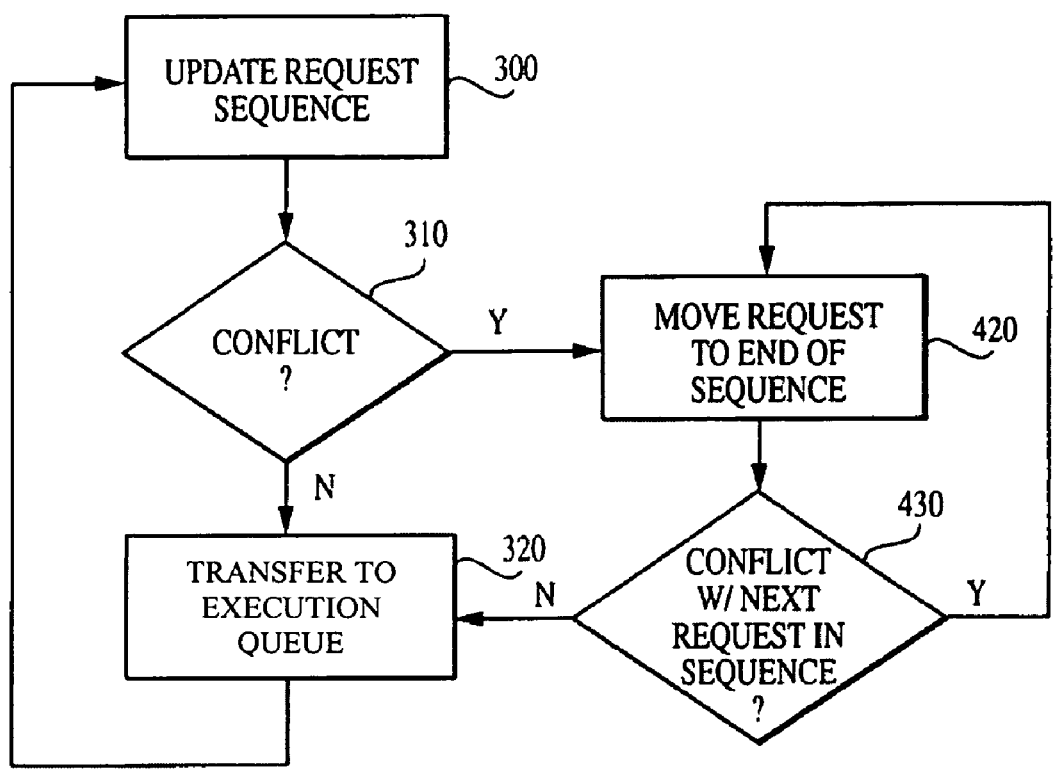
FIG. 5 is a third embodiment of a conflict re-ordering process performed by the sequence load logic unit in the memory controller upon detection of a conflict or delay in a current timing matrix.

A variation of the embodiment discussed above with reference to FIG. 4 is shown in FIG. 5, wherein if a conflict or delay is found with respect to the current timing position of the access request at the head of the sequence matrix, the offending request is sent to the back of the sequence, rather than being left in the sequence at its current location. Specifically, if a conflict is found at step 310, step 420 is executed in which the request having the conflict or delay is sent to the back of the sequence. Then, conflict detector 20 moves to the next access request in line to determine if any conflicts or delays are found with respect to that request (step 430). If no conflicts or delays are detected, the request is sent to the execution queue 24, similarly to the process shown in FIG. 4. If a conflict or delay is detected, the process returns to step 420.

Figure 6:
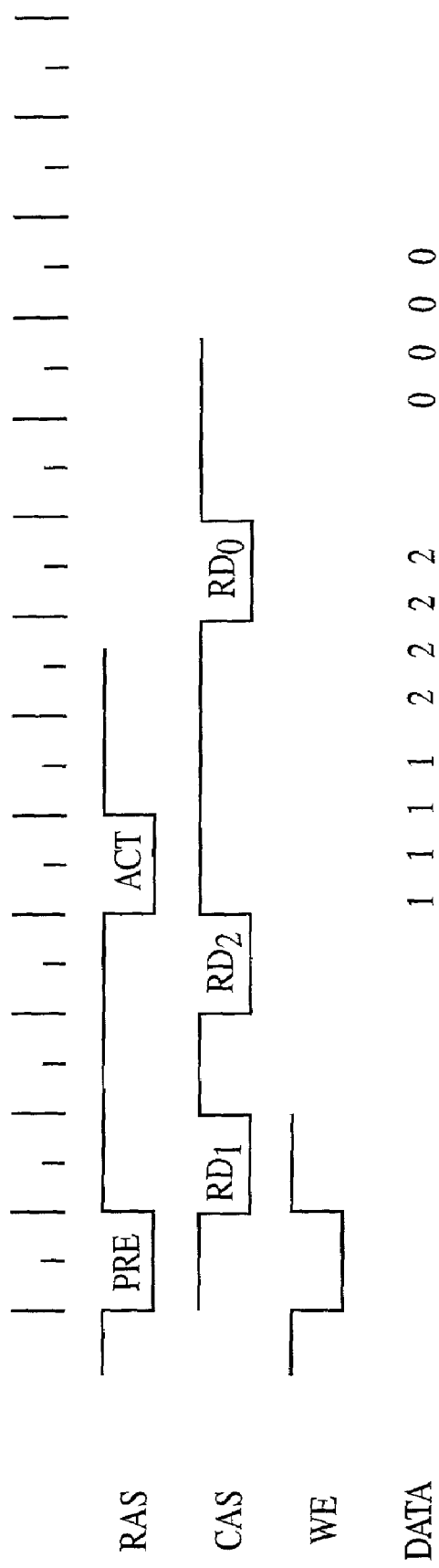
FIG. 6 is a timing diagram for illustrating the operation of the present invention.

Referring now to FIG. 6, a timing chart is shown illustrating the result obtained upon the operation of the present invention. In this example, read requests $RD_0$, $RD_1$, and $RD_2$ are received in the input queue in the order as listed. Assume that a page conflict condition has been detected with respect to $RD_0$, and that $RD_1$ and $RD_2$ are both page hits in other memory banks. Because a delay would have resulted if $RD_0$ were allowed to execute to completion before $RD_1$ and $RD_2$, the requests have been rearranged so that while the precharge operation is being performed for $RD_0$, read memory accesses for $RD_1$ and $RD_2$ are executed. Rearranging the commands in this manner minimizes the time that the memory data bus would have been idle while waiting for the precharge operation for $RD_0$ to finish executing, thus resulting in a more efficient utilization of the memory data bus.

After the data for $RD_1$ and $RD_2$ have been read from the DRAM, the activation operation for $RD_0$ is performed, and then the read access command for $RD_0$ is performed. The read data "1111" and "2222" are transferred to the returned data buffer in the order the read operations are executed. After the "0000" data is obtained from the appropriate memory cell, however, the data is returned first to the requestor of $RD_0$. Then, the data "1111" and "2222" are returned to their respective requestors, in that order.

Figure 7:
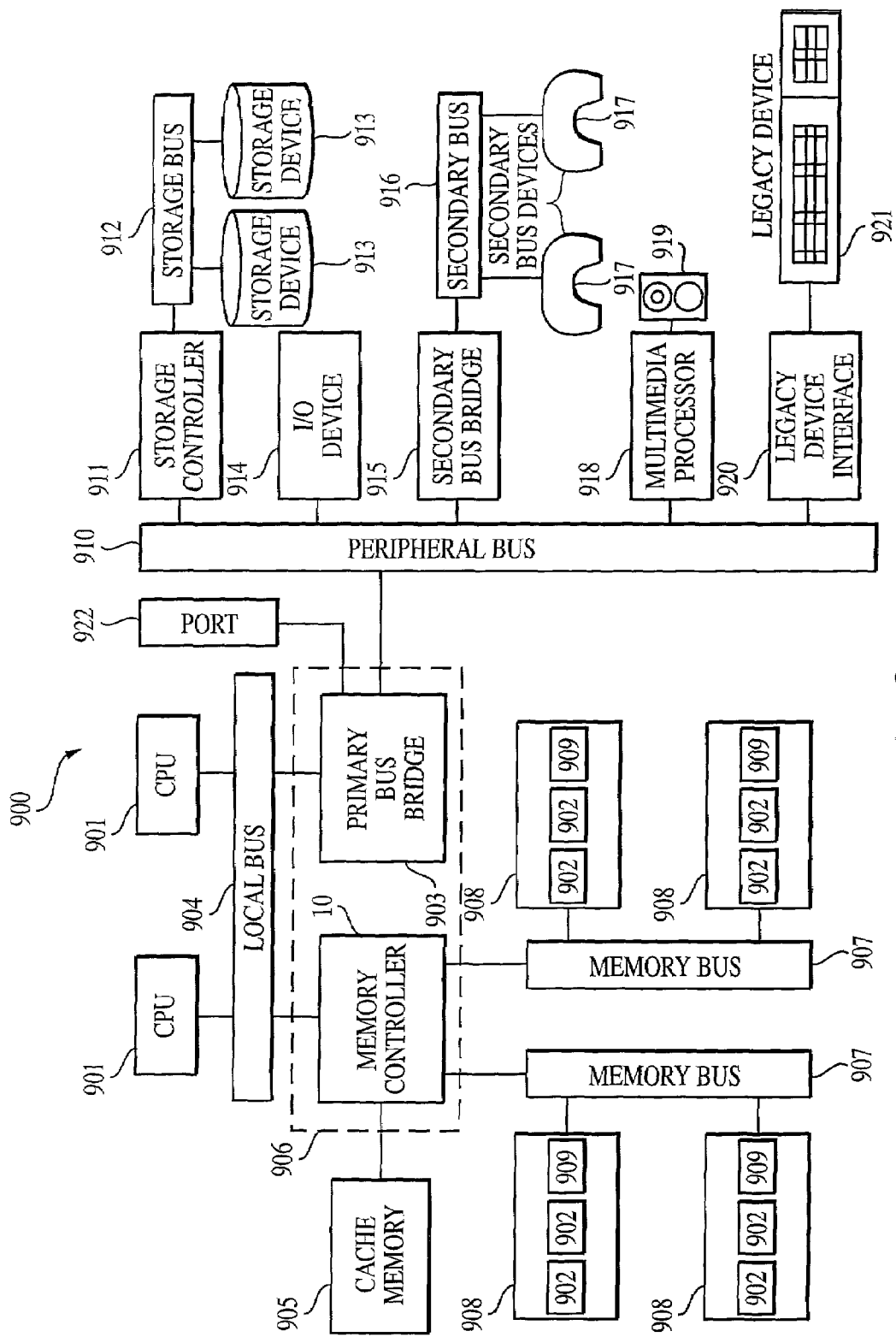
FIG. 7 is a block diagram of a processing system in which the memory controller of the present invention may be utilized.

FIG. 7 illustrates an exemplary processing system 900 which may utilize the memory controller 10 of the present invention. The processing system 900 includes one or more processors 901 coupled to a local bus 904. Memory controller 10 and a primary bus bridge 903 are also coupled the local bus 904. The processing system 900 may include multiple memory controllers 10 and/or multiple primary bus bridges 903. The memory controller 10 and the primary bus bridge 903 may be integrated as a single device 906.

The memory controller 10 is also coupled to one or more memory data buses 907. Each memory bus accepts memory components 908 which include at least one memory device 902. The memory components 908 may be formed as a memory card or a memory module. Examples of memory modules usable in the system 900 include single inline memory modules (SIMMs) and dual inline memory modules (DIMMs). The memory components 908 may include one or more additional devices 909. For example, in a SIMM or DIMM, the additional device 909 might be a configuration memory, such as a serial presence detect (SPD) memory.

The memory controller 10 may also be coupled to a cache memory 905. The cache memory 905 may be the only cache memory in the processing system. Alternatively, other devices, for example, processors 901 may also include cache memories, which may form a cache hierarchy with cache memory 905. If the processing system 900 include peripherals or controllers which are bus masters or which support direct memory access (DMA), the memory controller 10 may implement a cache coherency protocol. If the memory controller 10 is coupled to a plurality of memory buses 907, each memory bus 907 may be operated in parallel, or different address ranges may be mapped to different memory buses 907.

The primary bus bridge 903 is coupled to at least one peripheral bus 910. Various devices, such as peripherals or additional bus bridges may be coupled to the peripheral bus 910. These devices may include a storage controller 911, an miscellaneous I/O device 914, a secondary bus bridge 915, a multimedia processor 918, and an legacy device interface 920. The primary bus bridge 903 may also coupled to one or more special purpose high speed ports 922. In a personal computer, for example, the special purpose port might be the Accelerated Graphics Port (AGP), used to couple a high performance video card to the processing system 900.

The storage controller 911 couples one or more storage devices 913, via a storage bus 912, to the peripheral bus 910. For example, the storage controller 911 may be a SCSI controller and storage devices 913 may be SCSI discs. The I/O device 914 may be any sort of peripheral. For example, the I/O device 914 may be an local area network interface, such as an Ethernet card. The secondary bus bridge may be used to interface additional devices via another bus to the processing system. For example, the secondary bus bridge may be an universal serial port (USB) controller used to couple USB devices 917 via to the processing system 900. The multimedia processor 918 may be a sound card, a video capture card, or any other type of media interface, which may also be coupled to one additional devices such as speakers 919. The legacy device interface 920 is used to couple legacy devices, for example, older styled keyboards and mice, to the processing system 900.

The processing system 900 illustrated in FIG. 7 is only an exemplary processing system with which the invention may be used. While FIG. 7 illustrates a processing architecture especially suitable for a general purpose computer, such as a personal computer or a workstation, it should be recognized that well known modifications can be made to configure the processing system 900 to become more suitable for use in a variety of applications. For example, many electronic devices which require processing may be implemented using a simpler architecture which relies on a CPU 901 coupled to memory components 908 and/or memory devices 902. These electronic devices may include, but are not limited to audio/video processors and recorders, gaming consoles, digital television sets, wired or wireless telephones, navigation devices (including system based on the global positioning system (GPS) and/or inertial navigation), and digital cameras and/or recorders. The modifications may include, for example, elimination of unnecessary components, addition of specialized devices or circuits, and/or integration of a plurality of devices.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed as new and desired to be protected by Letters Patent of the United States is:

1. A memory controller comprising:
   an input queue for receiving a plurality of memory access requests in an originally received order from at least one requestor;
   a sequence matrix into which the plurality of memory access requests can be arranged, wherein the sequence matrix stores the plurality of memory access requests in a sequenced order;
   a sequencing unit for arranging a timing sequence of a plurality of memory access requests in the sequence matrix;
   a conflict detector for detecting whether a conflict or delay would occur among a sequence of memory access requests arranged in the sequence matrix by the sequencing unit, said conflict detector reporting a detected conflict or delay to said sequencing unit such that said sequencing unit rearranges the stored sequenced order of the requests within the sequence matrix when a conflict or delay is detected, the conflict or delay arising from a comparison of one of the memory access requests in the sequence matrix with a second memory access request in the sequence of memory access requests arranged in the sequence matrix or with one of a plurality of non-executed memory access requests that have previously been sequenced in the sequence matrix;
   an execution queue in which a plurality of commands are extracted from the memory access requests, each memory access request comprising either a read or write command and data control commands, the plurality of commands being arranged in an execution order determined by the sequence matrix, the execution order further arranged such that a data control command from a memory access request is executed before a read or write command from a previous memory access request is executed;
   a read return queue for keeping track of the original received order of the memory access requests after execution of the memory access requests from the execution queue in the execution order, and for returning requested data to the at least one requestor in the originally received order of the memory access requests; and
   a returned data buffer for holding requested data read from a memory until the data is to be returned to the requestor of the associated access request,
   wherein the controller is configured to interface with memory having multiple memory clock speeds.

2. The memory controller according to claim 1, further comprising:
   a command parser for parsing memory access requests into at least read or write commands, and data control commands; and
   a command sequencer for arranging the data control commands and the read or write commands for each access request in the execution queue.

3. The memory controller according to claim 2, further comprising a command selector for selecting at least one command at a time from the execution queue for execution.

4. The memory controller according to claim 3, wherein the number of commands selected during a fixed interval of time is dependent on a command selection clock signal fed to the command selector.

5. The memory controller according to claim 1, wherein the detector is capable of detecting a potential bank busy condition arising from the sequence of memory access requests arranged in the sequence matrix or the plurality of non-executed memory access requests.

6. The memory controller according to claim 1, wherein the detector is capable of detecting a potential page conflict condition arising from the sequence of memory access requests arranged in the sequence matrix or the plurality of non-executed memory access requests.

7. The memory controller according to claim 1, wherein the detector is capable of detecting a potential page miss condition arising from the sequence of memory access requests arranged in the sequence matrix or the plurality of non-executed memory access requests.

8. A memory controller comprising:
   a sequencing unit for receiving a plurality of memory access request signals from a plurality of requestors, the sequencing unit receiving the memory access request signals in a sequence corresponding to an order in which the requests were received from the requestors, wherein the memory access request signals comprise read requests and/or write requests;
   a rearranging unit for rearranging the sequence of the memory access request signals based on detected memory access conflicts between temporally proximate non-executed requests in the sequence, whereby execution of the memory access requests is to be performed in the rearranged sequence;
   an execution unit for extracting a plurality of commands from the memory access requests and executing the plurality of commands, each memory access request comprising either a read or write command and data control commands, the plurality of commands being arranged in an execution order corresponding to the rearranged sequence, the execution order further arranged such that a data control command from a memory access request is executed before a read or write command from a previous memory access request is executed; and a reordering unit for reordering executed read requests into the order in which the requests were originally received, whereby the data obtained by the executed read requests are to be returned to the requestors in the reordered sequence, wherein the controller is configured to interface with memory having multiple memory clock speeds.

9. The memory controller according to claim 8, wherein the rearranging unit rearranges the sequence of memory access requests to avoid a detected bank busy condition between temporally proximate non-executed requests m the sequence.

10. The memory controller according to claim 8, wherein the rearranging unit rearranges the sequence of memory access requests to minimize a delay caused by waiting for a memory bank to become available for access during a detected bank busy condition between temporally proximate non-executed requests m the sequence.

11. The memory controller according to claim 8, wherein the rearranging unit rearranges the sequence of memory access requests to avoid a detected page conflict condition between temporally proximate non-executed requests in the sequence.

12. The memory controller according to claim 8, wherein the rearranging unit rearranges the sequence of memory access requests to minimize a delay which would be caused by waiting for a memory bank to be prepared for access during a detected page conflict condition between temporally proximate non-executed requests in the sequence.

13. The memory controller according to claim 8, wherein the rearranging unit rearranges the sequence of memory access requests to minimize a delay which would be caused by waiting for a memory bank to be prepared for access during a detected page miss condition between temporally proximate non-executed requests in the sequence.

14. A memory controller comprising:

an input circuit for storing in arrival order a plurality of memory access requests;

a memory access request rearranging circuit for rearranging the stored memory access requests into a memory access request execution order, the rearranging circuit rearranging the order of the stored memory access requests into the execution order based on detection of a memory access conflict present in the order of the stored memory access requests, the memory access conflict arising from a comparison of one of the plurality of memory access requests with a second non-executed stored memory access request, each memory access request comprising a read or write command and data control commands, the memory access request rearranging circuit arranging a data control command from a memory access request to be executed before a read or write command from a previous memory access request is executed; and a sending circuit for outputting memory access requests in the execution order, the rearranging circuit operating at a first clock speed and being configured to interface with memory having multiple different memory clock speeds.

15. The memory controller according to claim 14, wherein the rearranging circuit rearranges the stored memory access requests based on detection of a bank busy conflict arising from the non-executed stored memory access requests.

16. The memory controller according to claim 15, wherein the rearranging circuit rearranges the stored memory access requests to avoid the detected bank busy conflict.

17. The memory controller according to claim 15, wherein the rearranging circuit rearranges the stored memory access requests to minimize a delay which would be caused by waiting for a memory bank to become available for access during the detected bank busy conflict if the memory access requests were to be executed in the stored order of memory access requests.

18. The memory controller according to claim 14, wherein the rearranging circuit rearranges the stored memory access requests based on detection of a page conflict condition in the order of the stored memory access requests, the page conflict condition arising from the non-executed stored memory access requests.

19. The memory controller according to claim 18, wherein the rearranging circuit rearranges the stored memory access requests to avoid the detected page conflict.

20. The memory controller according to claim 18, wherein the rearranging circuit rearranges the stored memory access requests to minimize a delay which would be caused by waiting for a memory bank to be prepared for access during a detected page conflict condition in the order of the stored memory access requests.

21. The memory controller according to claim 14, wherein the rearranging circuit rearranges the stored memory access requests based on detection of a page miss condition in the order of the stored memory access requests, the page miss condition arising from the non-executed stored memory access requests.

22. The memory controller according to claim 21, wherein the rearranging circuit rearranges the stored memory access requests to minimize a delay which would be caused by waiting for a memory bank to be prepared for access during a detected page miss condition in the order of the stored memory access requests.

23. The memory controller according to claim 14, further comprising:

an execution circuit for executing the stored memory access requests in the execution order; and a tracking circuit for keeping track of the arrival order of the stored memory access requests after execution.

24. The memory controller according to claim 23, wherein the tracking circuit associates a tag with each memory access request corresponding to its respective position in the arrival order.

25. The memory controller according to claim 23, wherein the tracking circuit includes a buffer for organizing data read from respective memory locations upon executing the memory access requests, whereby data arranged in the buffer can be transferred out of the memory controller in the original arrival order.

26. A method for controlling memory access operations, comprising:

receiving a plurality of memory access requests in a received sequence;

detecting memory access conflicts among temporally proximate non-executed requests in the sequence by comparing one of the plurality of memory access requests with a second non-executed memory access request from the plurality of memory access requests;

rearranging the sequence of requests based on the detection result;

executing the memory access requests in the rearranged order;

parsing each memory access request into at least a read or write command and a data control command; and selecting at least one command at a time from the rearranged sequence for execution at a memory clock speed.

wherein the step of rearranging the sequence of the requests further comprises separately arranging the read or write command and the data control command for each request in the rearranged sequence such that a data control command for a request is executed before a read or write command from a previous request is executed, and wherein the step of detecting memory access conflicts further comprises detecting conflicts arising from non-executed memory access requests.

27. The method according to claim 26, wherein the memory access requests include write requests to write data to designated memory addresses and read requests to read data from designated memory addresses.

28. The method according to claim 27, further comprising outputting from the memory controller, in the original order in the received sequence, data obtained from the designated memory addresses by the execution of the read requests.

29. The method according to claim 27, further comprising keeping track of the received sequence of memory access requests after execution; and transferring to respective requestors requested data obtained by execution of the read requests in the rearranged sequence, wherein the requested data is transferred to the respective requestors in an order corresponding to the received sequence of the respective read requests.

30. The method according to claim 29, wherein keeping track of the received sequence includes, after rearranging the sequence of requests, associating a tag with each read request to indicate the sequence in which the read requests were originally received.

31. The method according to claim 29, wherein keeping track of the received sequence includes, after rearranging the sequence of requests, assigning a buffer location into which data obtained upon the execution of each respective read request is to be stored, wherein the assigned buffer locations are indicative of the sequence in which the read requests were originally received.

32. The method according to claim 26, wherein the step of detecting is performed to detect whether a conflict would be created upon executing the most recently received memory access request in its current position in the received sequence.

33. The method according to claim 32, wherein the step of detecting is performed to detect whether a bank busy conflict would be created upon executing the most recently received memory access request in its current position in the received sequence.

34. The method according to claim 33, wherein the step of rearranging is performed to avoid the bank busy conflict.

35. The method according to claim 33, wherein the step of rearranging is performed to minimize a delay which would be caused by waiting for a memory bank to become available for access during a detected bank busy conflict.

36. The method according to claim 32, wherein the step of detecting is performed to detect whether a page conflict would be created upon executing the most recently received memory access request in its current position in the received sequence.

37. The method according to claim 36, wherein the step of rearranging is performed to avoid the page conflict.

38. The method according to claim 36, wherein the step of rearranging is performed to minimize a delay which would be caused by waiting for a memory bank to be prepared for access during a detected page conflict.

39. The method according to claim 26, wherein the step of detecting is performed to detect whether a delay would be created upon executing the most recently received memory access request in its current position in the received sequence.

40. The method according to claim 39, wherein the step of detecting is performed to detect whether a page miss would be created upon executing the most recently received memory access request in its current position in the received sequence.

41. The method according to claim 40, wherein the step of rearranging is performed to minimize a delay which would be caused by waiting for a memory bank to be prepared for access during a detected page miss.

42. The method according to claim 26, wherein the step of detecting is performed to detect whether a conflict would be created upon executing the earliest received memory access request in its current position in the received sequence.

43. The method according to claim 42, wherein the step of detecting is performed to detect whether a bank busy conflict would be created upon executing the earliest received memory access request in its current position in the received sequence.

44. The method according to claim 43, wherein the step of rearranging is performed to avoid the bank busy conflict.

45. The method according to claim 43, wherein the step of rearranging is performed to minimize a delay which would be caused by waiting for a memory bank to become available for access during a detected bank busy conflict.

46. The method according to claim 42, wherein the step of detecting is performed to detect whether a page conflict would be created upon executing the earliest received memory access request in its current position in the received sequence.

47. The method according to claim 46, wherein the step of rearranging is performed to avoid the page conflict.

48. The method according to claim 46, wherein the step of rearranging is performed to minimize a delay which would be caused by waiting for a memory bank to be prepared for access during a detected page conflict.

49. The method according to claim 42, wherein if a conflict is detected with respect to the earliest received memory access request in the received sequence, the step of rearranging includes moving the earliest received memory access request to the end of the sequence corresponding generally to a position following the most recently received memory access request in the sequence.

50. The method according to claim 26, wherein the step of detecting is performed to detect whether a delay would be created upon executing the earliest received memory access request in its current position in the received sequence.

51. The method according to claim 50, wherein the step of detecting is performed to detect whether a page miss would be created upon executing the earliest received memory access request in its current position in the received sequence.

52. The method according to claim 51, wherein the step of rearranging is performed to minimize a delay which would be caused by waiting for a memory bank to be prepared for access during a detected page miss.

53. The method according to claim 50, wherein if a conflict is detected with respect to the earliest received memory access request in the received sequence, the step of rearranging includes moving the earliest received memory access request to the end of the sequence corresponding generally to a position following the most recently received memory access request in the sequence.

54. A processor system comprising:
a processor;
at least one memory device for exchanging data with the processor; and
a memory controller for managing memory access requests from the processor to the at least one memory device, the memory controller comprising:
a sequencing unit for receiving a plurality of memory access request signals from a plurality of requestors, the sequencing unit receiving the memory access request signals in a sequence corresponding to an order in which the requests were received from the requestors, wherein the memory access request signals comprise either read requests and/or write requests and data control commands;
a rearranging unit for rearranging the sequence of the memory access request signals based on detected memory access conflicts between temporally proximate non-executed requests in the sequence, the memory access conflicts detected by comparing a memory access request signal with non-executed memory access request signals, whereby execution of the memory access requests is to be performed in the rearranged sequence;
an execution unit for executing the memory access requests in the rearranged sequence, the execution unit configured to execute a data control command from a memory access request signal before executing a read or write command from a previous memory access request signal; and
a reordering unit for reordering executed read requests into the order in which the requests were originally received, whereby the data obtained by the executed read requests are to be returned to the requestors in the reordered sequence,
wherein the controller is configured to interface with memory having one of multiple memory clock speeds.

* * * * *

UNITED STATES PATENT AND TRADEMARK OFFICE
CERTIFICATE OF CORRECTION

| | | |
|---|---|---|
| PATENT NO. | : 7,149,857 B2 | Page 1 of 1 |
| APPLICATION NO. | : 10/143896 | |
| DATED | : December 12, 2006 | |
| INVENTOR(S) | : Joseph M. Jeddeloh | |

It is certified that error appears in the above-identified patent and that said Letters Patent is hereby corrected as shown below:

Column 8:

Line 36, "include" should read --includes--;

Lines 47-48, "an miscellaneous" should read --a miscellaneous--;

Line 49, "an legacy" should read --a legacy--;

Line 50, "also coupled" should read --also be coupled--;

Line 60, "an local" should read --a local-;

Line 64, "an universal" should read --a universal--; and

Line 65, "via to the" should read --via the--.

Column 9:

Line 1, "to one additional" should read --to additional--; and

Line 19, "system" should read --systems--.

In Claim 10, the following error is corrected:

Column 11, line 21, "m" should read --in--.

Signed and Sealed this

Thirteenth Day of March, 2007

JON W. DUDAS
*Director of the United States Patent and Trademark Office*